United States Patent [19]

Cancilleri

[11] 4,115,337

[45] Sep. 19, 1978

[54] PROCESS FOR MANUFACTURING ENAMELS OF POLYESTER-POLYIMIDE RESINS, PARTICULARLY FOR COATING ELECTRIC CONDUCTORS

[75] Inventor: Ezio Cancilleri, Verdellino (Bergamo), Italy

[73] Assignee: Cean S.p.A., Italy

[21] Appl. No.: 647,604

[22] Filed: Jan. 8, 1976

[30] Foreign Application Priority Data

Jan. 15, 1975 [IT] Italy ............................. 19280 A/75
Dec. 22, 1975 [IT] Italy ............................. 30621 A/75

[51] Int. Cl.² .......................... C08J 3/10; C08J 3/12
[52] U.S. Cl. ............................. 260/29.2 N; 424/458
[58] Field of Search ................................. 260/29.2 N

[56] References Cited

U.S. PATENT DOCUMENTS

| | | | |
|---|---|---|---|
| 3,528,937 | 9/1970 | Reynolds et al. | 260/29.2 N |
| 3,936,404 | 2/1976 | Ishizuka et al. | 260/29.2 N |
| 3,966,655 | 6/1976 | Kovacs et al. | 260/29.2 N |

*Primary Examiner*—Carman J. Seccuro
*Attorney, Agent, or Firm*—Weingarten, Maxham & Schurgin

[57] ABSTRACT

A process for obtaining enamels, suitable for use as a coating, based upon aqueous solutions of polyester-polyimide resin. The resin is obtained by a polycondensation reaction and has a free acid number N in excess of 30.

17 Claims, No Drawings

PROCESS FOR MANUFACTURING ENAMELS OF POLYESTER-POLYIMIDE RESINS, PARTICULARLY FOR COATING ELECTRIC CONDUCTORS

The invention refers to a process for preparing enamels based on a polyester-polyimide resin, particularly suitable for coating electric conductors. More particularly, the invention relates to a process for preparing an enamel on polyester-polyimide basis wherein the polyester part comprises as a component tris-(2-hydroxyethyl)-isocianurate.

It is known, that among the alkydic resins used for the production of coating compositions, the polyester-polyimide resins are those which find particular use for obtaining enamels for coating electric conductors. This is due to their excellent chemical-physicial properties such as e.g.: a good thermal stability, a good resistance to solvents, high hardness and flexibility, good resistance to combined thermal and mechanical stresses, good stability during thermal shock tests.

It is further known from Italian Pat. No. 761,528 to SCHENECTADY CHEMICALS INC. that, when at least 20% of the alcoholic component of the polyester part in a polyester-polyimide resin comprises tris-(2-hydroxyethyl) isocianurate, the enamel obtained from said resin has a thermal life at a temperature of 260° C. (based on the AIEE test No. 57) exceeding 250 hours. This means a substantially improved thermal stability as compared to that of an enamel wherein the alcoholic component of the polyester part is selected among those of a conventional type.

In order to obtain an enamel maintaining all the optimal chemical-physical properties of the polyimide-polyester resin from which it is obtained, and which may be easily used for coating electric conductors, e.g. copper wire, it is necessary for the selected resin to be dissolved in a convenient solvent, with an appropriate catalyst added thereto so as to obtain a low viscosity bath having a high percentage of dry contents To this effect and in accordance with the teachings of the known technique, the polyester polyimide resins selected for obtaining an enamel are dissolved at elevated temperature in one or more solvents, selected in the group comprising phenols, cresols, cresylic acid, xylenols, N-methylpyrrolidone, dimethylformamide, dimethylacetamide, dimethylsulfpholane and the like. The more largely used solvent is usually cresol.

It is known that the protective enamelling of electric conductors is obtained by applying a solution or bath of a resin of the above mentioned type onto the electric conductor and subsequently passing at a predetermined speed said conductor through an oven of predetermined length having precalculated inlet and outlet temperatures. During the said passage, the polyester-polyimide resin with catalyst added thereto undergoes a final polycondensation, and dries forming on the conductor the desired protective enamel coating whereas the solvent is converted to the gaseous state and as such is discharged from the oven to the environment.

Since the solvents used heretofore for dissolving the polyester-polyimide resins are notoriously toxic, the gases discharged from the enamelling oven, which mainly consist of said solvents in gaseous state, are extremely obnoxious for the humans and the environment where they are discharged.

The toxicity of the discharge gases originating from enamelling furnaces represents a problem which is particularly felt in the art and requires an ultimate solution.

Up to now, the efforts made to reduce toxicity of said discharge gases are essentially based on use of combustion catalysts. However, the use of the latter catalysts while yielding satisfactory results in the desired reduction if not the total elimination of toxicity of the gases, on the other hand involves the disadvantage of a substantial economic burden on the enamelling processes.

Other disadvantages, connected with the use of toxic solvents of the above mentioned type consist in the cost of said solvents, as well as their continuously decreasing availability on the market.

The problem which represents the background of this invention is to provide a process for the manufacture of enamels for electric conductors starting from polyester-polyimide resins wherein the resins may simply be dissolved in water and yet yield an enamelling solution or bath having a viscosity and a dry substance content fully comparable with the enamelling solutions or baths known in the prior art.

This problem is solved according to the invention by a process for obtaining enamels for electric conductors based on a polyester-polyimide resin, characterized in that it comprises:

— preparing said resin with a number of free reactive carboxyl groups such as to confer to said resin a free acid number N above 30, — cooling and subsequently granulating the resin, — adding the cool granulated resin to a water bath at a ratio of 20–50 parts (preferably 25–35 parts) of resin to 100 parts of water, — heating the bath with resin added thereto to a temperature from 30° C. to 70° C., preferably from 40° C. to 60° C., — adding to the bath containing said resin while maintaining said temperature, an amminic salifying agent for said free carboxyl groups and a catalyst selected from the group of titanium-alkyl compounds, — stirring the bath while maintaining said temperature till complete dissolution.

According to a further feature of this invention, the above number of free carboxyl groups is obtained by using as acidic component for the polyester part of said resin trimellitic anhydride, pyromellitic anhydride, terephthalic acid or an ester thereof, isophthalic acid or an ester thereof, aromatic anhydrides or di-anhydrides of tetracarboxylic acids with two or more phenyl rings in the molecule such as e.g. the di-anhydride of benzophenonetetracarboxylic acid.

The free acid number N represents the number of milligrams of KOH necessary for salifying one gram of the resin comprising free carboxylic groups.

The alcoholic component of the polyester part of said resin may be the tris-(2-hydroxyethyl)-isocianurate, ethylene glycol, glycerine, pentaerythritol, 1,1,1-trimethylolethane, 1,1,1-trimethylolpropane, sorbitol, mannitol, dipentaerythritol, 1,4-butanediol, propylene glycol or other polyol conventionally used in polyester resin art. The alcoholic component preferred in the polyester part of the polyester-polyimide resin used for obtaining the enamels according to this invention is tris-(2-hydroxyethyl)-isocianurate or ethylene glycol, either alone or in mutual mixture. If used in the form of a mixture, an excess of tris-(2-hydroxyethyl) isocianurate is preferred as compared to ethylene glycol.

The components forming the polyimide part of the polyester-polyimide resin used for obtaining the enamels according to this invention comprise a trimellitic anhydride, piromellitic di-anhydride and the aromatic polyamines conventionally used for obtaining said polyimide such as e.g. methylenedianiline, benzidine, 3,3'-diamino diphenyl, paraphenylenediammine, 4,4'-diamino-phenylether, 4,4-dimethyl heptamethyldiamine, 1,7-diaminodiphenyl-ketone, metaphenylene-diamine, xylenediamine, esamethylene-diamine, ethylenediamine, diamino-diphenylmethane and the like. The preferred components for the resin are trimellitic anhydride and diaminodiphenyl-methane.

Among the amminic salifying agents for the free carboxyl groups of the polyester-polyimide resin used for obtaining the enamels of this invention, those preferred are selected from the class of amino-alcohols and tertiary ammines and mixtures thereof, such as e.g. 2-dimethylamino-2-methyl-1-propanol, dimethyl-ethanolamine, diethyl-ethanolamine, dimethyl-isobutylamine, monoethanolamine; triethylamine, triethanolamine, methylmorpholine, ethyl-morpholine and the like. Among amminoalcohols, the preferred one is dimethylethanolamine.

The titanium-alkyl compound used as catalyst is selected preferably in the group comprising triethanolamine titanate, titanate of octyl glycol, titanium lactate, triisopropanolamine titanate, diethanolamine titanate. The preferred catalysts are triethanolamine-titanate and titanium lactate.

The advantages achieved by the invention are particularly remarkable in that an enamel obtained by the process according to this invention is fully water-soluble and therefore, while passing through the oven for its drying and enamelling of an electric conductor, the gases that are discharged from said oven consist to a large extent of water vapour and are in any case exempt of toxic components.

Though the most significant use of an enamel obtained by the process according to this invention is that of a protective coating of electric conductors, said enamel may easily be used also for all other coating purposes for which alkydic resins and more particularly polyester-polyimide resins have been used heretofore.

The invention shall be better understood from the following examples of carrying same into practice, given for explanatory purposes only.

EXAMPLE I

A polyester-polyimide resin was prepared with a free acid number N = 44, by operating as follows:

In a three-necked flask provided with a thermometer, a stirrer and a distillation column, 157.2 g of ethylene glycol, 621.2 g of tris-(2-hydroxyethyl)-isocyanurate, 221.2 g of trimellitic anhydride, 129.4 g of dimethyl-terephthalate, 0.8 g of zinc octoate at 8% concentration and 1.3 g of a polycondensation catalyst consisting of butyl-titanate monomer were charged. The reaction mixture was heated under stirring up to a temperature of 150° C. Subsequently and still on stirring, the temperature of the mixture was increased by 10° C. per hour till reaching 185° C. From this moment onward heating of the flask was adjusted to maintain the temperature of the reaction mixture within the range from 180° C. to 185° C. till the polycondensation reaction was completed yielding the polyester part of the resin.

While still keeping the temperature within the range from 180° C. to 185° C., and preferably around 185° C., a mixture comprising 326.6 g of diamino diphenyl methane and 754.6 g of trimellitic anhydride, as well as 123.2 g of ethyleneglycol was added to the polyester part obtained as explained above, during a period of 6 hours and by small portions, in order to provide the polyimidic part. The polycondensation was allowed to continue under a progressively increasing temperature of the reaction mixture till a maximum temperature of 190° C. was reached.

When a free acid number equalling 44 for the reaction mixture was ascertained, based on tests made on samples taken from the flask, the polycondensation was stopped and the resin, discharged from the flask was cooled down to room temperature and subsequently granulated.

27 parts of the granulated polyester-polyimide resin obtained as indicated above were added under stirring to 70 parts of distilled water heated at a controlled temperature of about 60° C. Subsequently a salifying agent was added to said bath comprising dimethyl-ethanolamine in an amount of 7–11% by weight referred to the dry matter content, followed by a catalyst consisting of triethanolamine titanate.

The bath thus obtained was maintained under stirring and at the above temperature until complete dissolution of polyester-polyimide resin was reached.

Once the resin was dissolved, the bath was allowed to cool (always under stirring) to room temperature.

The bath, which comprised a clear solution of the salified polyester-polyimide resin as above, had a viscosity of about 100 cP at 20° C. and a dry matter content of approximately 27% by weight.

The solution, which represents a water-soluble enamel according to this invention, was used for coating a crude copper wire having a diameter of 0.50 mm. The water-soluble enamel was applied onto said wire by the known felt-pas technique and the wire was subsequently passed at a speed of 16 meters/minute through a drying oven of a 1.75 meters length and having an inlet temperature of 450° C. and an outlet temperature of 550° C. and provided with a conventional catalyst for the combustion of the smoke. When leaving the oven, the copper wire had a uniform, bubble-free coating, of a thickness of 45 microns. Tests made on said coating yielded the following results:
thermoplasticity point: 380° C.
thermal shock ½ hour at 225° C.: 1 X φ OK
Pencil hardness at the delivery state: 5H
Pencil hardness after 30 minutes in ethanol at 60° C.: 3H
flexibility after elongation by 20%: 1X During treatment in the drying oven of the coated copper wire, by use of the water soluble enamel obtained as indicated above, gases were discharged from the oven comprising water vapour and 8–15 ppm of oxyde and dioxyde of nitrogen.

Other water-soluble enamels were prepared according to this invention, by adopting the procedure indicated in the above example, while varying the free acid number N within the interval from 40 to 60 by conveniently varying the amounts of trimellitic anhydride used for obtaining the polyester-polyimide resin, further by varying the temperature of the distilled water bath within the range from 30° C. to 70° C. and by varying the weight percentage of granulated polyester-polyimide resin added to said water bath in the range from 25 to 35 parts of resin per 100 parts of water. Consequently, the amounts of salifying agent were varied too, within the range from 5 to 15% referred to the dry matter content.

In all these cases, water soluble enamels were always obtained which, when applied to electric conductors particularly copper wire, constantly yielded optimal results fully comparable with the results cited above in detail. During drying of said electric conductors in the oven gases were discharged constantly and essentially comprising water vapour.

EXAMPLE II

Into a three-necked flask provided with a thermometer, a stirrer and a distillation column, the following were charged: 206.5 g of ethylene glycol, 815.5 g of tris-(2-hydroxyethyl)-isocianurate, 483 g of dimethyl-terephthalate, 1.75 g of zinc acetate and 1.75 g of monomeric butyl-titanate. The mixture was heated up to a temperature of 150° C. under stirring. Always under stirring the temperature was increased every hour by 10° C. till 185° C. were reached. While maintaining said temperature, the polycondensation reaction for obtaining the polyester part was allowed to go ahead until completeness.

While maintaining constant the temperature, at about 185° C., a mixture comprising 1060.5 g of trimellitic anhydride and 476 g of diaminodiphenylmethane was added to the polyester part during an interval of 5 hours at small portions. Polycondensation was allowed to continue at a maximum temperature of 190° C. till a free number N equalling 45 was obtained.

The resin obtained was discharged from the flask and allowed to cool to room temperature and subsequently granulated.

153 Parts of the granulated polyester-polyimide resin obtained as above were added to 344.7 parts of distilled water under stirring. While maintaining stirring the flask was heated to 45° C. and at this temperature a salifying agent was added by portions comprising dimethyl-ethanolamine in the amount of 11% by weight referred to the resin. Subsequently, the obtained solution was cooled abruptly under stirring to a temperature of 20°-25° C. and 1.5% by weight referred to the dry matter content were added of an ethoxylated surface active agent known as Lubriol NX marketed by I.C.I. as well as 4% by weight of a catalyst consisting of titanium lactate. The solution, after convenient stirring and subsequent standstill, showed a viscosity of 30 seconds at 20° C. in a 4 mm Ford cup (DIN) and a dry residue of 27%.

EXAMPLE III

In a three-necked flask provided with a thermometer, a stirrer and a distillation column, 418 g of ethylene glycol, 1650 g of tris-(2-hydroxy-ethyl)-isocianurate, 785.5 g of isophthalic acid, 2.1 g of zinc octoate at 8%, 3.5 g of monomeric butyl titanate were introduced. The mixture was heated to a temperature of 150° C., and subsequently the temperature was increased under stirring by 10° C. per hour till reaching a value within the range from 190° to 195° C. While maintaining the latter temperature, the polycondensation reaction of the polyester part was completed. At a temperature of 185° C. in the flask, a mixture comprising 1868 g of trimellitic anhydride and 963 g of diamino-diphenylmethane was added in a period of 6 hours at small portions; during said period 150 g of ethylene glycol were also added.

The polycondensation reaction was allowed to continue till the temperature reached a maximum of 200° C. Tests made on samples taken from the flask showed a free acid number $N = 35$. The polycondensation was stopped and the resin allowed to cool to 170° C. At the latter temperature and always under stirring 310 g of trimellitic anhydride were added.

After complete dissolution of the added anhydride the N number of the resin was 50 and the resin discharged from the flask was cooled to room temperature and granulated. Separately, an aqueous solution was prepared comprising 264 parts of distilled water and 10 parts of dimethyl-ethanolamine. Said solution was brought to a temperature of 56° C. and at said temperature 97.6 parts of granulated resin obtained in the manner described above were added under stirring. Stirring was maintained till complete dissolution of the resin. The solution thus obtained was cooled under stirring to room temperature and a surface active agent Lubriol NX in the amount of 1.5% and 0.5% by weight referred to the dried product of POLYVIOL M 07/140 of WACKER CHEMIE, were added thereto as well as a polyvinylic colloidal protective agent and a catalyst consisting of titanium lactate.

The solution obtained had a viscosity of approximately 100 cP at 20° C. and a dry matter content of approximately 27% by weight. Solutions prepared in accordance with Examples II and III were water soluble enamels having properties and characteristics fully comparable with the enamel according to Example I. It has been ascertained that by using from 0.1 to 10% by weight, referred to the resin, of surface active substances such as esters of fatty acids, alcohols and sulphonic acids, aminic salts and ethoxylated and propoxylated compounds, a water soluble enamel was obtained having a still improved stability and enhanced capacity to be absorbed by the felt pads conventionally used for applying the enamel onto wires. Also the use of the amount of from 0.1% to 10% of colloidal protective substances such as e.g. polyvinyl alcohols, involved an improvement of the property of self-levelling of the enamel coating as the latter is formed on copper wires.

We claim:

1. A process for obtaining enamels based on aqueous solutions of polyester-polyimide resin in which said resin is obtained by a polycondensation reaction and has a number of reactive free carboxyl groups such as to confer to said resin a free acid number N in excess of 30, said process comprising the steps of:
    cooling said resin; then
    granulating said resin;
    adding said granulated resin to a water bath in a ratio of between 20 and 50 parts to 100 parts of water by weight;
    heating the resin-containing bath thus obtained to a temperature within the range of from 30° C. to 70° C.;
    adding to said bath comprising said resin, while maintaining said temperature, an aminic salifying agent selected from the group comprising aminoalcohols and tertiary amines for said free carboxyl groups;
    adding a catalyst selected from the group of titanium-alkyl compounds; and
    stirring said bath while maintaining the above temperature to complete dissolution.

2. The process according to claim 1 wherein said granulated resin preferably constitutes a ratio of between 25 and 35 parts to 100 parts of water by weight.

3. The process according to claim 1 wherein said temperature range for said heating step is preferably in the range of from 40° C. to 60° C.

4. The process according to claim 1 wherein said number of free carboxyl groups in said resin is obtained by using as acidic component for the polyester part of the resin a mixture of trimellitic anhydride and terephthalic acid, with an excess of trimellitic anhydride.

5. The process according to claim 1 wherein the alcoholic component of the polyester part of the resin comprises tris-(2-hydroxyethyl)-isocianurate or ethylene glycol, either alone or admixed together.

6. The process according to claim 5 wherein the alcoholic component of the polyester part of the resin comprises a mixture of tris-(2-hydroxyethyl)-isocianurate and ethylene glycol, with an excess of tris-(2-hydroxyethyl)-isocianurate.

7. The process according to claim 1 wherein the polyimide part of said polyimide-polyester resin comprises trimellitic anhydride and an aromatic polyamine.

8. The process according to claim 7 wherein said aromatic polyamine is diaminodiphenylmethane.

9. The process according to claim 1 wherein said salifying agent is selected from the class of aminoalcohols and tertiary amines.

10. Process according to claim 9, wherein said aminic salifying agent is dimethyl-ethanolamine.

11. The process according to claim 1 wherein the catalyst of the group of titanium-alkyl compounds is selected from the class consisting of triethanolaminotitanate, octyl glycol titanate, triisopropanolamino-titanate, titanium lactate, and diethanolamino-titanate.

12. The process according to claim 11 wherein the catalyst is triethanolamino-titanate.

13. The process according to claim 11 wherein said catalyst is titanium lactate.

14. The process according to claim 1 wherein to said bath added with said salifying agent and said catalyst a surface active agent is added in an amount from 0.1 to 10% by weight referred to the resin.

15. The process according to claim 14 wherein said surface active agent is selected from the group consisting of fatty acid esters, alcohols and sulphonic acids, aminic salts and ethoxylated compounds.

16. The process according to claim 14 wherein a colloidal protective substance of the class of polyvinylic alcohols is added to the resin in the amount of 0.1 to 10% by weight referred to the resin.

17. A process for obtaining enamels based on aqueous solutions of polyester-polyimide resin, comprising the steps of:

combining the constituents to form the polyester part of said resin with a number of reactive free carboxyl groups so as to confer to said resin a free acid number N in excess of 30;

forming said polyester part of said resin by a polycondensation reaction;

adding to said polyester part thus formed the constituents to form the polyimide part of said resin; then forming said polyester-polyimide resin by a polycondensation reaction;

stopping said polycondensation reaction when said free acid number is in excess of 30;

cooling said resin; then granulating said resin;

adding said granulated resin to a water bath in a ratio of between 20 and 50 parts to 100 parts of water by weight;

heating the resin-containing bath thus obtained to a temperature within the range of from 30° C. to 70° C.;

adding to said bath comprising said resin, while maintaining said temperature, an aminic salifying agent selected from the group comprising aminoalcohols and tertiary amines for said free carboxyl groups;

adding a catalyst selected from the group of titanium-alkyl compounds; and stirring said bath while maintaining the above temperature to complete dissolution.

* * * * *